Aug. 8, 1961  J. R. WRIGHT ET AL  2,995,065
REFRACTORS

Filed Dec. 18, 1956  2 Sheets-Sheet 1

INVENTORS
JOHN R. WRIGHT
GEORGE F. SCHENK
BY
Herbert C. Kimball
ATTORNEY

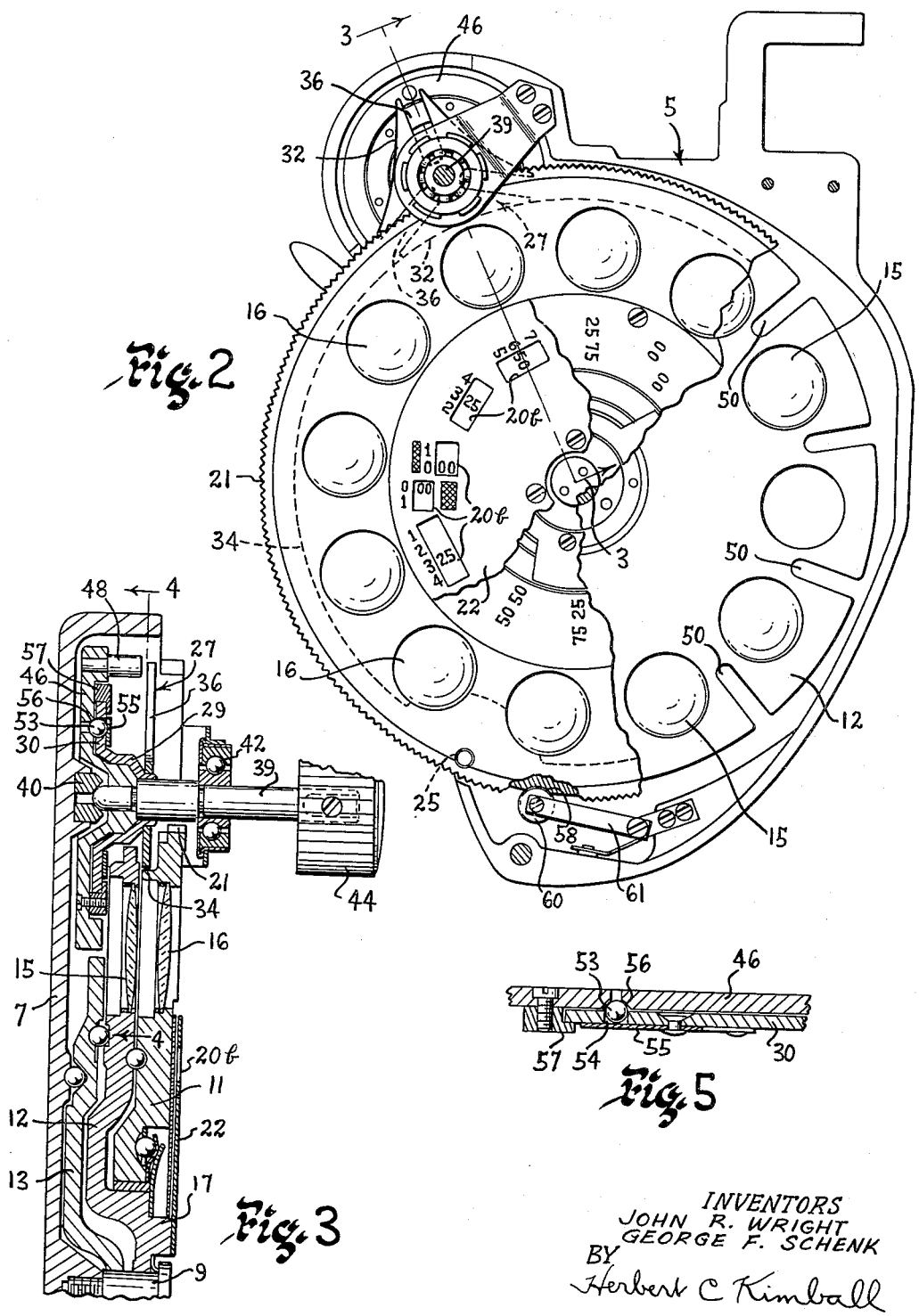

United States Patent Office 2,995,065
Patented Aug. 8, 1961

2,995,065
REFRACTORS
John R. Wright, Eggertsville, and George F. Schenk, Buffalo, N.Y., assignors to American Optical Company, Southbridge, Mass., a voluntary association of Massachusttes
Filed Dec. 18, 1956, Ser. No. 629,059
5 Claims. (Cl. 88—22)

This invention relates to expeditious means for positioning a practitioner's choice from a graded series of trial lenses so that the shortcomings of the patient's vision may be determined and the proper prescription ascertained.

An object of the invention is to afford the practitioner the greatest convenience in controlling the movement of the graded series of lenses into and out of position before the patient's eyes.

In the drawings in which a refractor embodying our invention is illustrated,

FIG. 2 is a face view of the rotatable disk in which the weak spherical lenses are mounted, this disk being partially broken away to show a part of the underlying strong sphere disk;

FIG. 3 is a cross-section on line 3—3 of FIG. 2 showing the actuating mechanism for the strong sphere disk;

FIG. 5 is a detail sectional view on the line 5—5 of FIG. 4.

Figure 1:
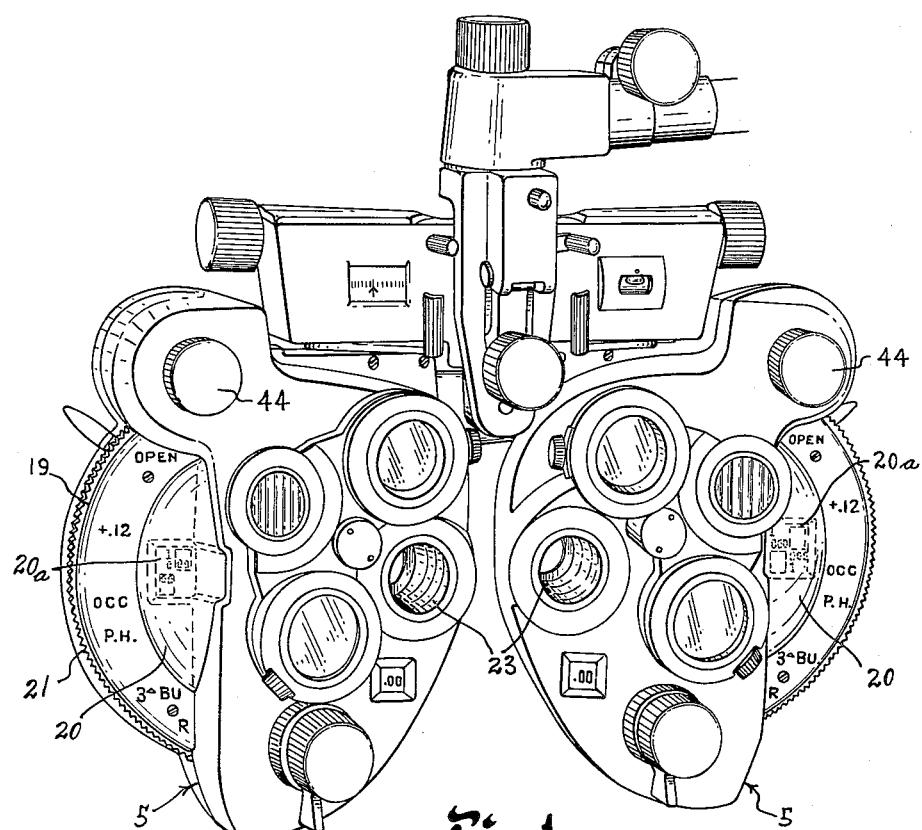
FIG. 1 is a perspective view of the instrument showing the controls by which the instrument is operated.

An instrument of this character places at the disposal of the practitioner such a wide variety of lenses and tests that the controls may become cumbersome and inconveniently placed. The practitioner is accustomed to stand on the side from which the perspective view of FIGURE 1 is taken, and time and effort is consumed if he must reach around to the patient's side of the refractor to operate one or more controls. Moreover, the patient is less annoyed if that side of the refractor is free of projections such as knobs when the face is presented to the instrument with the eyes aligned with the sight tubes.

In describing the invention but one lens battery will be discussed, it being understood that substantially the only difference between the two batteries is that one is a right hand battery and the other is a left hand battery. The main housing 5 of the lens battery has a back wall 7 which is free of knobs and other controls needed in the operation of the instrument. A stud 9 is threaded into the wall 7 and provides a journal on which the lens disks 12 and 13 are rotatably carried. In the rearmost disk 13 are mounted auxiliary lenses and other auxiliary devices, with which the present application is not primarily concerned. In the intermediate disk 12 are mounted the strong spherical lenses 15 which are not used so long as the patient's requirements lie within the range of the weak spherical lenses 16 mounted in the forward disk 11. For the sake of compactness, the disk 11 is not journaled directly on the stud 9 but is rotatably mounted on the hub 17 of the intermediate disk 12. A slit 19 left in the housing 5 permits the knurled edge 21 of the disk 11 to be engaged by the practitioner's finger to bring about rotation of the desired spherical lens 16 into position in alignment with the sight tube 23. By direct contact with the edge 21 of the disk 11, therefore, the practitioner can locate in the sight tube 23 a clear aperture or any one of eleven lenses ranging from minus 1D to plus 1.75D.

A transparent closure 20 for the opening 20a through which the dial 22 (see FIG. 2) is visible magnifies the lens power indications both on this dial 22 and on the disk 11 beneath it. The lens power indications on the disk 11 become visible through that opening 20b in dial 22 which is in alignment with the opening 20a; and as the dial 22 is secured to the hub 17 of disk 12, the particular opening 20b which is operative at any time depends on which lens 15 has been moved into the sight tube 23. Moreover, if the practitioner continues to dial beyond minus one diopter in one direction or beyond plus 1.75 diopter in the other, the continued rotation of the disk 11 actuates the Geneva movement shown in FIGS. 2 and 3 so as to advance disk 12 by the space of one lens.

Such actuation is brought about by a pin or knob 25 on the back side of the rim of the disk 11. This knob 25 projects into the plane of the Geneva wheel 27 which is fixed on the hub 29 of the slip connection or clutch 30. The Geneva wheel 27 is of conventional form, having arcuate cut-out portions 32 which cooperate with a flange 34 adjacent the periphery of the disk 11 to hld the wheel 27 stationary throughout most of each complete rotation of the disk 11. Adjacent the knob 25 the flange 34 is recessed, and when the knob 25 enters one of the slots 36, the wheel 27 is caused to make one-third of a turn before the knob leaves the slot 36. The clutch member 30 fixed to the wheel 27 also make one-third of a revolution.

The operating member for directly controlling the disk 12 takes the form of a short shaft 39 on which the hub of the clutch 30 is journaled, and which projects through the front of the housing 5 instead of through the back wall 7. A thrust bearing 40 fixed in the back wall 7 carries one end of the shaft 39, and a ball bearing 42 supports the shaft 39 where it passes through the front of the housing.

Figure 4:
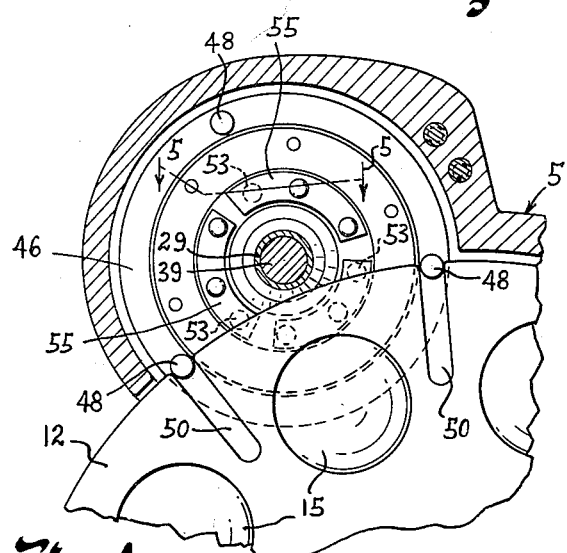
FIG. 4 is a detail sectional view on the line 4—4 of FIG. 3.

A knob 44 on the prjecting end of shaft 39 permits the practitioner to rotate the pin gear 46 which is fixed to the inner end of shaft 39. This gear 46 carries a series (here three in number) of pins 48 which impart rotation to the intermediate disk 12 when the gear 46 is rotated. In so doing, each pin 48 in turn enters a radial slot 50 (see FIG. 4) in the rim of disk 12 and advances the disk by the space of one lens before leaving the slot. From FIG. 4 it will be apparent that the disk 12 is fully under the control of pin gear 46, the effect being that pin gear 46 "meshes" with the periphery of disk 12 and permits the disk to advance only when the gear rotates. When the Geneva wheel 27 is stationary, which is compelled by the flange 34 during most of the manipulation of disk 11 (the exception being the recess in flange 34 adjacent the knob 25), the pin gear 46 will be held in the position shown in FIG. 4, unless knob 44 is turned by the practitioner. As is apparent from FIG. 4, two pins 48 of the gear 46 mesh with slots 50 to prevent accidental rotation of the disk 12.

Thus, two sources of actuating power for the rotation of disk 12 are provided by the mechanism described. The operating member 39, 44 directly actuates the pin gear 46 (in either direction) to bring higher power lenses into the sight tube 23 or to return to a lower power lens or to a clear aperture. The turning of disk 11 (by contact with its knurled edge 21) indirectly provides actuating power for rotating disk 12 by way of Geneva wheel 27 and the slip driving connection 30. The hub of member 30 is rotatable relative to shaft 39, but spring pressed balls 53 (see FIG. 4) contained in openings 54 in the clutch 30 tend to nest in depressions 56 in the gear 46. So long as the actuating power comes from the turning of disk 11, the balls 53 under pressure from the springs 55 remain nested in the depressions 56 and the clutch 30 drives the gear 46. If on the other hand the disk 11 is stationary, thereby holding Geneva wheel 27 stationary, the intermediate disk 12 can be directly driven by the gear 46 under control of shaft 39, and at this time the balls 53 of the slip driving connection lift out of the depressions 56 against the action of springs 55 so that the gear 46 may be rotated relative to the clutch 30. To counteract the lifting force when the balls 53 are thus displaced, a thrust bearing 57 fixed to the wheel 46 cooperates with the rim of clutch 30 to retain the clutch in proper position.

With each third of a revolution of the operating member 39, 44, a new lens 15 is presented in the sight tube 23 and the balls 53 drop again into the depressions 56. The disk 12 is never out of control of the pins 48 because the gear 46 is so placed relative to the edge of disk 12 that another pin 48 has entered a slot 50 before the previous pin 48 has emerged from its slot 50 as the gear 46 is rotated. Accordingly, if the forward disk 11 is properly indexed, the intermediate disk 12 is indexed by the balls 53 dropping into depressions 56 so as to properly align the respective lens 15 with the sight tube 23.

The indexing of the forward disk 11 is accomplished by a series (equaling in number the number of lenses) of depressions 58 in the rim of disk 11 just back of the knurling. A roller 60 on a spring pressed arm 61 rides on the rim of disk 11 in alignment with the depressions 58, and indexes the series of lenses 15 by dropping into the corresponding depressions 58.

If the practitioner wishes to rapidly dial to a relatively high power, or having used a high power, wishes to return the instrument to a lower power or to zero, he turns the knob 44 which gives direct drive of the disk 12. The disk 11 he can turn as desired by directly contacting its rim with his finger. This gives rapid selection of the lens combination to be positioned in the sight tube 23.

It will be noted that the shaft 39 projects forwardly, and this is made possible by journaling the hub 29 of clutch 30 carrying Geneva wheel 27 on this shaft 39. As previously brought out, the practitioner stands on the forward side of the instrument. The present invention positions the projecting end of shaft 39 on the forward side of the instrument within easy reach. Moreover, the rear side of the instrument is freed of such controls as the knob 44. Although the shaft 39 by which the disk 12 is directly operated is very close to the edges of the coaxial disks 11 nad 12, only one-third of a turn of this shaft is necessary to advance the disk 12 by the space of one lens 15. There is considerable advantage to the use of a pin gear in this relation because of the extent of movement of the disk 12 which a pin 48 accomplishes from the time it enters a slot 50 to the time it leaves, or approximately one third of a revolution of knob 44. This is of importance where a compact arrangement is desirable. These advantages are accomplished without disturbing the arrangement of the higher powered spherical lenses behind the lower powered shperical lenses. Accordingly, the invention improves the usefulness and convenience of the refractor.

In the drawings are found indications of mechanism for angling the lens batteries to take care of convergence of the patient's eyes for near vision tests. This mechanism is completely disclosed and is claimed in the application of John R. Wright, Serial No. 574,774 filed March 29, 1956, now Patent No. 2,923,200, issued February 2, 1960.

We claim:

1. The combination in a refractor of a housing having a sight aperture for alignment with a patient's eye, a plurality of lens disks therein mounted to rotate in parallel planes normal to said sight opening in said housing, one og said disks carrying a plurality of test spherical lenses of relatively strong power, and a second of said disks carrying a plurality of test spherical lenses of relatively weaker power, the first named disk being closer to the patient than the second named disk, and both disks being rotatable to bring selected test lenses into said aperture to test the patient's eye, Geneva mechanism connecting said first and second disks including a Geneva wheel driven directly by said second named disk for imparting step by step rotation to said first named disk, the axis of said Geneva wheel being outside the periphery of both disks and closely adjacent the periphery of the second named disk, a gear coaxial with said Geneva wheel for driving said first named disk and a slip driving connection between said Geneva wheel and said gear, and an operating shaft extending axially through said Geneva wheel and through the side of said housing remote from the patient and having positive driving connection with said gear.

2. The combination in a refractor of a housing adapted to be disposed in front of the face of a patient and having a sight aperture for alignment with the patient's eye under examination, a pair of lens disks rotatably mounted in said housing in parallel planes normal to said sight opening, the disk nearer the patient carrying test lenses of relatively stronger power than the test lenses of the more remote disk and both disks being rotatable to bring selected test lenses into said aperture to test the patient's eye, Geneva mechanism connecting said disks to drive the disk nearer the patient from the more remote disk including a Geneva wheel directly driven by the more remote disk, the axis of said Geneva wheel being outside the periphery of both disks and closely adjacent the periphery of the more remote disk, a pin gear coaxial with said Geneva wheel for driving said nearer disk and a slip driving connection between said Geneva wheel and said gear, and an operating shaft extending axially through said Geneva wheel and through the side of said housing remote from the patient and having positive driving connection with said gear.

3. The combination in a refractor of a pair of parallel disks, each carrying a plurality of test lenses for the examination of a patient's eye, one of said disks carrying lenses of relatively stronger power than the test lenses of the other disk, a housing for said disks having a sight aperture for alignment with the patient's eye, said disks being rotatably mounted in said housing to bring selected test lenses into said aperture to test the patient's eye, the disk carrying the lenses of stronger power being closer to the patient than the other disk, Geneva mechanism connecting said disks to drive the disk nearer the patient from the more remote disk including a Geneva wheel directly driven by a projection on the more remote disk, the axis of said Geneva wheel being outside the periphery of both disks and closely adjacent the periphery of said more remote disk, an actuating member rotatable coaxially with said Geneva wheel for driving said nearer disk and a slip driving connection between said Geneva wheel and said actuating member, and an operating shaft having positive driving connection with said actuating member, said shaft extending axially through said Geneva wheel and through the side of said housing remote from the patient and rotatably supporting said Geneva wheel.

4. The combination in a refractor of a housing adapted to be disposed in front of the face of a patient and having a sight aperture for alignment with the patient's eye under examination, a plurality of lens disks therein mounted to rotate in parallel planes normal to said sight opening, each disk carrying a plurality of test elements for use in testing the patient's eye, Geneva mechanism connecting a pair of said disks to drive the disk nearer the patient from the more remote disk including a Geneva wheel directly driven from said more remote disk, the axis of said Geneva wheel being outside the periphery of both disks and closely adjacent the periphery of the more remote disk, an actuating member coaxial with said Geneva wheel having a plurality of pins thereon for entering radial slots in said nearer disk to drive said nearer disk, a slip driving connection between said Geneva wheel and said actuating member, and an operating shaft having positive driving connection with said actuating member, said shaft extending axially through said Geneva wheel and through the side of said housing remote from the patient and rotatably supporting said Geneva wheel.

5. The combination in a refractor of a housing adapted to be disposed in front of the face of a patient and having a sight aperture for alignment with the patient's eye under examination, a pair of lens disks mounted on a common axis in said housing for rotation in parallel planes normal to said sight aperture, the lenses of the disk nearer the patient being of relatively stronger power than the lenses of the more remote disk, Geneva mechanism connecting said disks to drive the nearer disk from the more remote disk including a Geneva wheel directly driven by a projection on the more remote disk, the axis of said Geneva wheel being outside the periphery of both disks and closely adjacent the periphery of the more remote disk, a rotatable actuating member coaxial with said Geneva wheel for driving the nearer disk and a slip driving connection between said Geneva wheel and said actuating member, said actuating member having a plurality of pins thereon for entering radial slots in the nearer disk to drive said more remote disk, and an operating shaft extending through the side of said housing remote from the patient, said operating shaft fixedly carrying said actuating member and rotatably supporting said Geneva wheel.

References Cited in the file of this patent

UNITED STATES PATENTS

| | | |
|---|---|---|
| 563,717 | Knauer | July 7, 1896 |
| 1,172,827 | Opitz | Feb. 22, 1916 |
| 1,596,717 | Clement et al. | Aug. 17, 1926 |
| 1,666,406 | Clement et al. | Apr. 17, 1928 |
| 1,804,691 | Hunsicker | May 12, 1931 |
| 1,945,940 | Hunsicker | Feb. 6, 1934 |